(12) United States Patent
Ikushima et al.

(10) Patent No.: US 11,763,606 B2
(45) Date of Patent: Sep. 19, 2023

(54) CONDITION EVALUATION PROCESSOR FOR IN-VEHICLE DEVICE

(71) Applicant: TOYOTA JIDOSHA KABUSHIKI KAISHA, Toyota (JP)

(72) Inventors: Yoshihiro Ikushima, Okazaki (JP); Ryota Nakabayashi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 210 days.

(21) Appl. No.: 17/218,239

(22) Filed: Mar. 31, 2021

(65) Prior Publication Data

US 2021/0366208 A1 Nov. 25, 2021

(30) Foreign Application Priority Data

May 22, 2020 (JP) ................................ 2020-090129

(51) Int. Cl.
*G07C 5/00* (2006.01)
*G06Q 10/30* (2023.01)
*G07C 5/08* (2006.01)

(52) U.S. Cl.
CPC ............. *G07C 5/006* (2013.01); *G06Q 10/30* (2013.01); *G07C 5/0808* (2013.01)

(58) Field of Classification Search
CPC ...... G07C 5/006; G07C 5/0808; G07C 5/085; G06Q 10/30; G06Q 30/0278; Y02W 90/00; H04L 67/12
See application file for complete search history.

(56) References Cited

U.S. PATENT DOCUMENTS

| | | | |
|---|---|---|---|
| 2009/0012668 A1 | 1/2009 | Maesono | |
| 2018/0222343 A1 | 8/2018 | Uchida | |
| 2019/0385387 A1* | 12/2019 | Davidson | ............... G07C 5/008 |
| 2021/0002004 A1* | 1/2021 | Georgeson | ............. G06F 30/15 |

FOREIGN PATENT DOCUMENTS

| | | |
|---|---|---|
| CN | 105160583 A | 12/2015 |
| JP | 2010-146446 A | 7/2010 |
| JP | 2018-128769 A | 8/2018 |

OTHER PUBLICATIONS

Maesono Noboru, "On-Vehicle Parts Evaluation System", 2005 (Year: 2005).*

* cited by examiner

Primary Examiner — James J Lee
Assistant Examiner — Jonathan E Reinert
(74) Attorney, Agent, or Firm — Oliff PLC

(57) ABSTRACT

A condition evaluation system evaluates a condition of an in-vehicle device installed in a vehicle. The condition evaluation system includes: an evaluation unit configured to acquire load information indicating a load on the in-vehicle device when the vehicle is used and, each time the load information is acquired, derive a condition rank of the in-vehicle device based on the load information, the condition rank indicating at least whether the in-vehicle device should be recycled; and a storage unit configured to store the condition rank derived by the evaluation unit.

8 Claims, 4 Drawing Sheets

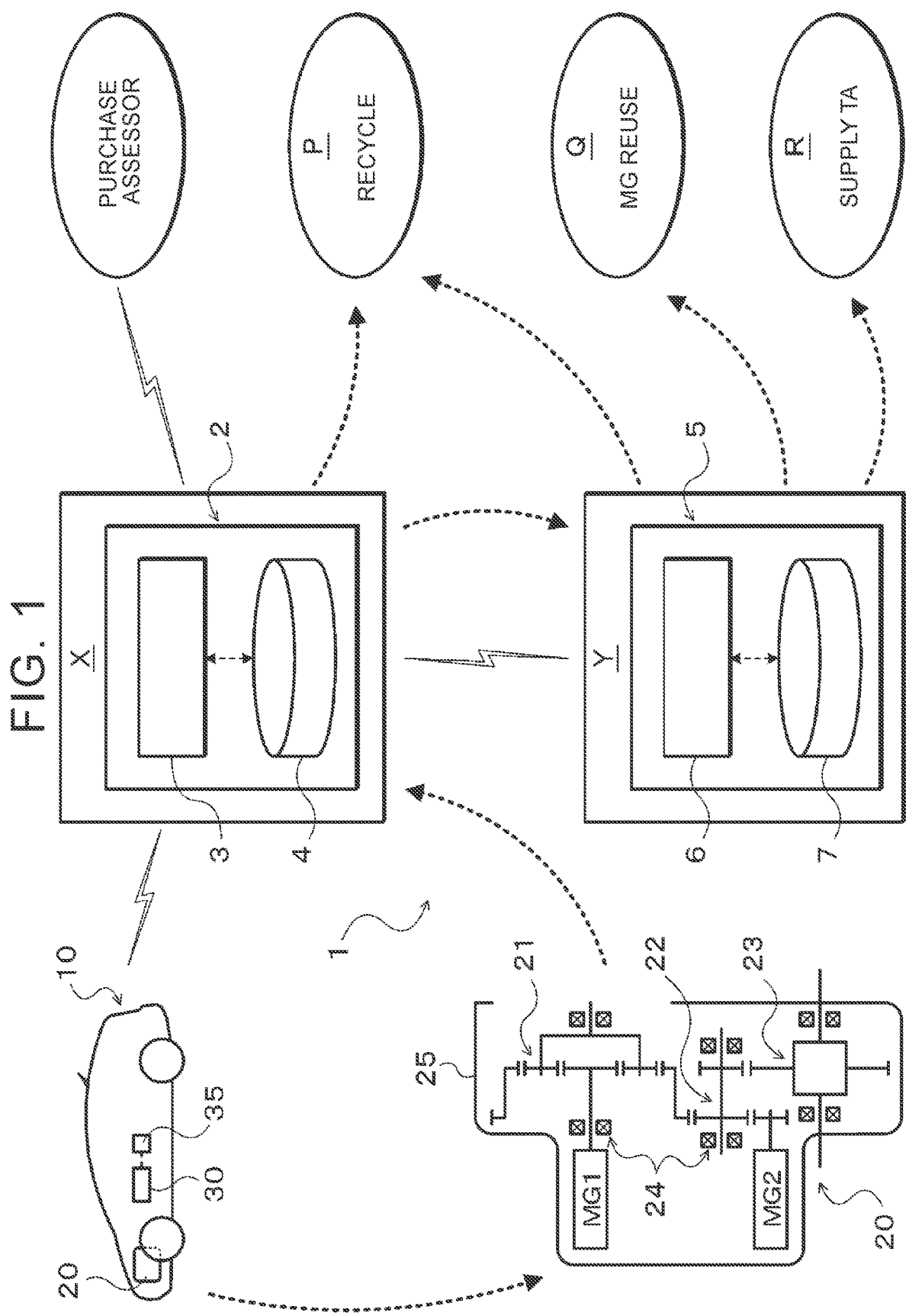

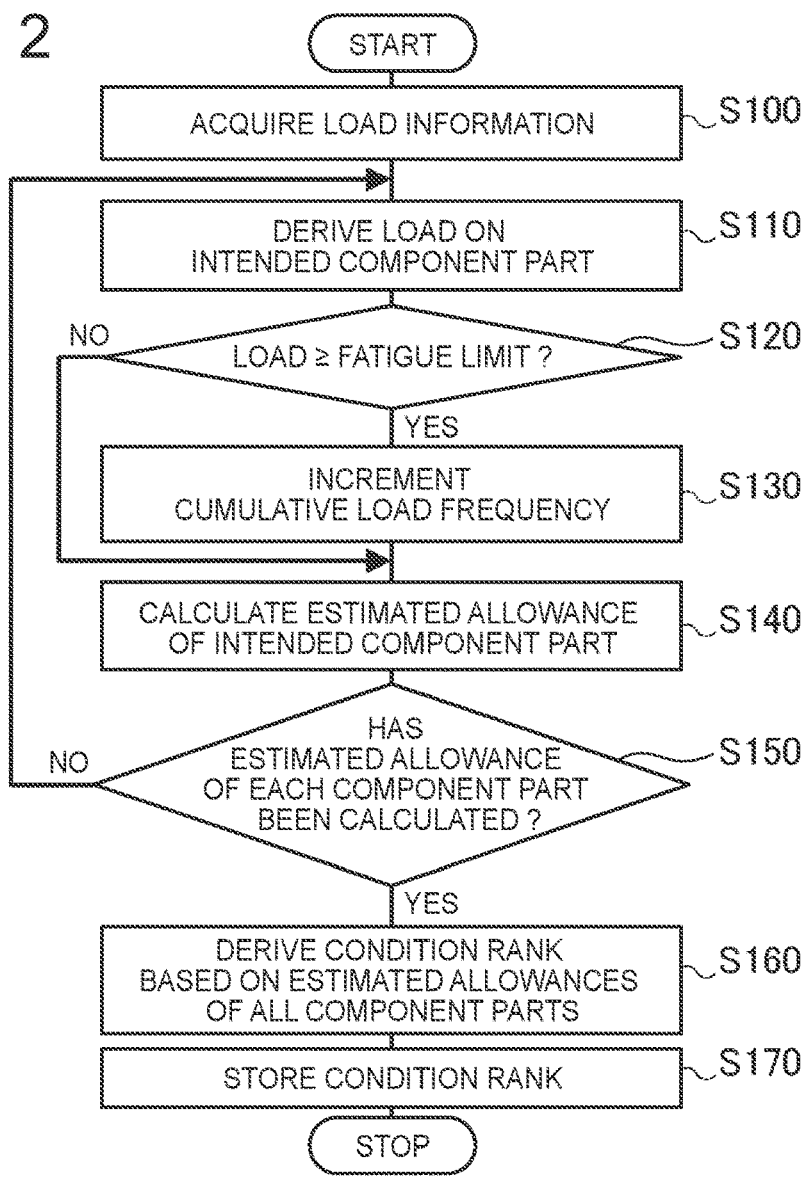
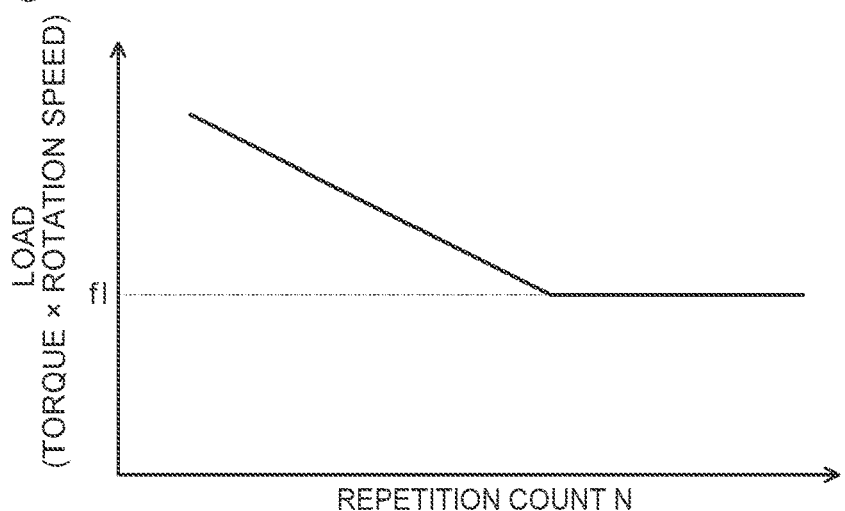

| COMPONENT PART \ RANK | A | B1 | B2 | B3 | C |
|---|---|---|---|---|---|
| MG1 | GOOD | GOOD | GOOD | NOT GOOD | NOT GOOD |
| MG2 | GOOD | GOOD | NOT GOOD | GOOD | NOT GOOD |
| GEAR | GOOD | AT LEAST ANY ONE IS NOT GOOD | AT LEAST ANY ONE IS NOT GOOD | AT LEAST ANY ONE IS NOT GOOD | — |
| CASE | GOOD | | | | |
| BEARING | GOOD | | | | |

GOOD : REUSABLE, NOT GOOD : UNREUSABLE

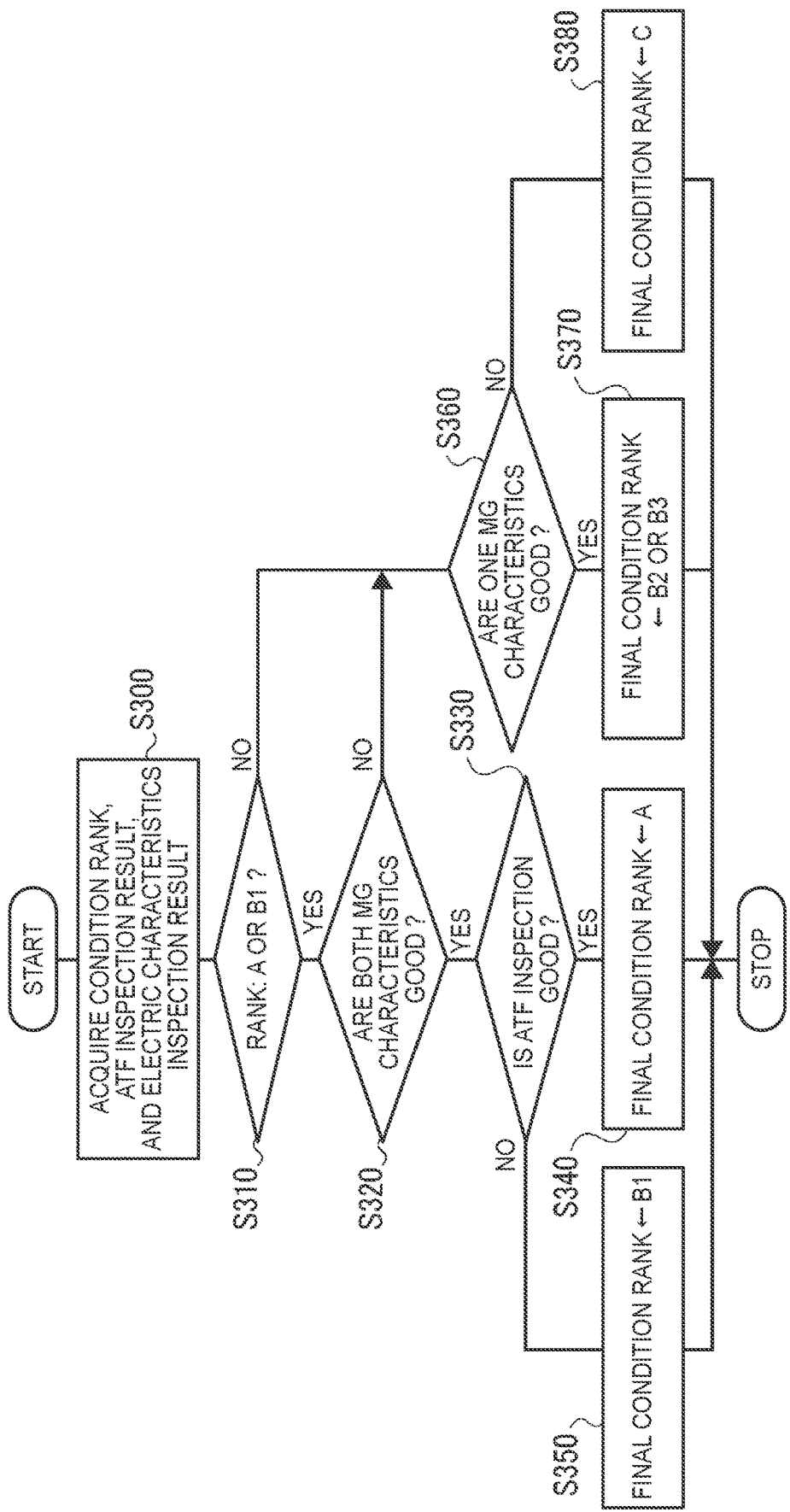

CONDITION EVALUATION PROCESSOR FOR IN-VEHICLE DEVICE

CROSS-REFERENCE TO RELATED APPLICATION

This application claims priority to Japanese Patent Application No. 2020-090129 filed on May 22, 2020, incorporated herein by reference in its entirety.

BACKGROUND

1. Technical Field

The disclosure relates to a condition evaluation system and condition evaluation method for an in-vehicle device, which evaluate the condition of the in-vehicle device mounted on a vehicle.

2. Description of Related Art

There is known an abandoned vehicle purchase estimation system for estimating the purchase price of an abandoned vehicle for disposal (see, for example, Japanese Unexamined Patent Application Publication No. 2010-146446 (JP 2010-146446 A)). The abandoned vehicle purchase estimation system includes a server and a plurality of client devices. The server stores a slip database, a vehicle search database, a vehicle type database, a parts database, a parts sales results database, and the like. The vehicle type database of the server stores maker name, vehicle type name, model number, and the like in association with one another for each of a plurality of commercial vehicles. The parts database stores part number, part name, installation section, ASSY information, and the like in association with one another for each of a plurality of parts unique to each vehicle type. The parts sales results database stores historical sales results prices in the reuse market as reuse price information for various parts. The parts sales results database stores sales results price, sales date, and the like in association with part number, part name, installation section, vehicle type name, model number, part model year, and the like. In using the abandoned vehicle purchase estimation system, an estimator inputs, to a client device, estimating vehicle type information that is information about the vehicle type of an abandoned vehicle that is an estimated object, and extracted section information indicating a part installed at which section of a vehicle is an estimated object. When the estimating vehicle type information and the extracted section information are input to the client device, the server identifies parts information about the parts of the abandoned vehicle that is an estimated object, associated with the same section information as the extracted section information from the client device, and reuse price information associated with the parts information. Thus, it is possible to provide information about reusable parts among a plurality of parts installed in an abandoned vehicle without causing an estimator to investigate which parts and how many parts are present in each vehicle section determined to be reusable. The server calculates a reuse parts purchase price based on the sum of the reuse price information identified as the reuse sales results of the reusable parts, and reflects the calculated price in the purchase price of the abandoned vehicle. Thus, it is possible to easily estimate price appropriately reflecting the values of reusable parts.

SUMMARY

In using the existing abandoned vehicle purchase estimation system, an estimator separately determines (estimates) whether each section of an abandoned vehicle that is an estimated object includes reusable parts in accordance with appearance, travel distance, and the like, and then inputs extracted section information to a client device. However, there are concerns that sections determined to include reusable parts in accordance with appearance, travel distance, and the like include parts that are actually unreusable and that should be recycled. Therefore, the abandoned vehicle purchase estimation system has still room for improvement in properly and rationally proceeding with recycle and reuse of in-vehicle parts.

The disclosure provides a condition evaluation system for an in-vehicle device, useful in properly and rationally proceeding with recycle and reuse of in-vehicle devices.

An aspect of the disclosure relates to a condition evaluation system that evaluates a condition of an in-vehicle device installed in a vehicle. The condition evaluation system includes: an evaluation unit configured to acquire load information indicating a load on the in-vehicle device when the vehicle is used and, each time the load information is acquired, derive a condition rank of the in-vehicle device based on the load information, the condition rank indicating at least whether the in-vehicle device should be recycled; and a storage unit configured to store the condition rank derived by the evaluation unit.

The condition evaluation system for an in-vehicle device according to the disclosure includes an evaluation unit configured to acquire load information indicating a load on the in-vehicle device when the vehicle is used. The evaluation unit is configured to, each time the load information is acquired, derive a condition rank of the in-vehicle device based on the load information. The condition rank indicates at least whether the in-vehicle device should be recycled. The condition rank of the in-vehicle device, derived by the evaluation unit, is stored in a storage unit. Thus, by referring to the condition rank stored in the storage unit, it is possible to determine whether the in-vehicle device should be recycled or at least a part of the in-vehicle device is reusable. As a result, with the condition evaluation system according to the disclosure, it is possible to properly and rationally proceed with recycle and reuse of in-vehicle devices.

The condition rank may include a first rank indicating that the entire in-vehicle device is reusable, a second rank indicating that some of component parts of the in-vehicle device are reusable, and a third rank indicating that the in-vehicle device should be recycled. Thus, by referring to the condition rank, it is possible to easily determine the transaction price of the in-vehicle device and component parts to be remanufactured or reused, and destinations to transport used products.

The in-vehicle device may include a plurality of component parts, the evaluation unit may be configured to derive a frequency with which a load exceeds a fatigue limit based on the load information for each of the plurality of component parts, and the evaluation unit may be configured to derive the condition rank based on the frequencies respectively derived for the plurality of component parts. Thus, it is possible to properly derive the condition rank of an in-vehicle device according to the used condition of a vehicle.

The evaluation unit may be configured to acquire diagnosis information and a travel distance of the vehicle, the diagnosis information indicates a diagnosed result of the in-vehicle device by the vehicle, and the evaluation unit may be configured to, when the vehicle diagnoses that there is an abnormality in the in-vehicle device or the travel distance of the vehicle exceeds a predetermined value, sets the condition rank to the third rank. Thus, it is possible to bring the condition rank further in conformity with an actual situation.

The condition evaluation system may further include a second evaluation unit configured to derive a final condition rank of the in-vehicle device based on the condition rank derived by the evaluation unit, and a result of inspection on the in-vehicle device removed from the vehicle. Thus, it is possible to obtain a final condition rank that exceedingly properly reflects the condition of an in-vehicle device and properly and rationally proceed with recycle, reuse, and the like of the in-vehicle device by referring to the final condition rank.

The evaluation unit and the storage unit may be included in a server capable of communicating with the vehicle. In other words, when a condition rank is derived and stored in the server, it is possible to reduce a processing load in a vehicle and obtain a useful condition rank.

The evaluation unit and the storage unit may be included in a server capable of communicating with the vehicle, and the second evaluation unit may be managed by a manager different from a manager of the server. In other words, the condition rank and final condition rank of an in-vehicle device may be provided by different managers.

The evaluation unit and the storage unit may be installed in the vehicle.

The in-vehicle device may be a powertrain including an electric motor. In other words, the condition evaluation system according to the aspect of the disclosure is exceedingly suitable to proceed with recycle, reuse, and the like of powertrains mounted on hybrid vehicles and electric vehicles.

Another aspect of the disclosure relates to a condition evaluation method that evaluates a condition of an in-vehicle device mounted on a vehicle. The condition evaluation method includes: acquiring load information indicating a load on the in-vehicle device when the vehicle is used; each time the load information is acquired, deriving a condition rank of the in-vehicle device based on the load information, the condition rank indicating at least whether the in-vehicle device should be recycled; and storing the derived condition rank in a storage unit.

With the above method, by referring to the condition rank stored in the storage unit, it is possible to determine whether the in-vehicle device should be recycled or at least a part of the in-vehicle device is reusable. As a result, with the condition evaluation method according to the aspect of the disclosure, it is possible to properly and rationally proceed with recycle and reuse of in-vehicle devices.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a schematic configuration diagram showing an example of a condition evaluation system for an in-vehicle device according to an embodiment of the disclosure;

FIG. 2 is a flowchart showing an example of a rank derivation routine to be executed by an evaluation unit of the condition evaluation system according to the embodiment of the disclosure;

FIG. 3 is a graph illustrating a chart that defines the relationship between a load on each component part of the in-vehicle device and a repetition count;

FIG. 6 is a flowchart showing an example of a rank finalization routine to be executed by a second evaluation unit of the condition evaluation system according to the embodiment of the disclosure.

DETAILED DESCRIPTION OF EMBODIMENTS

Figures 4, 5:
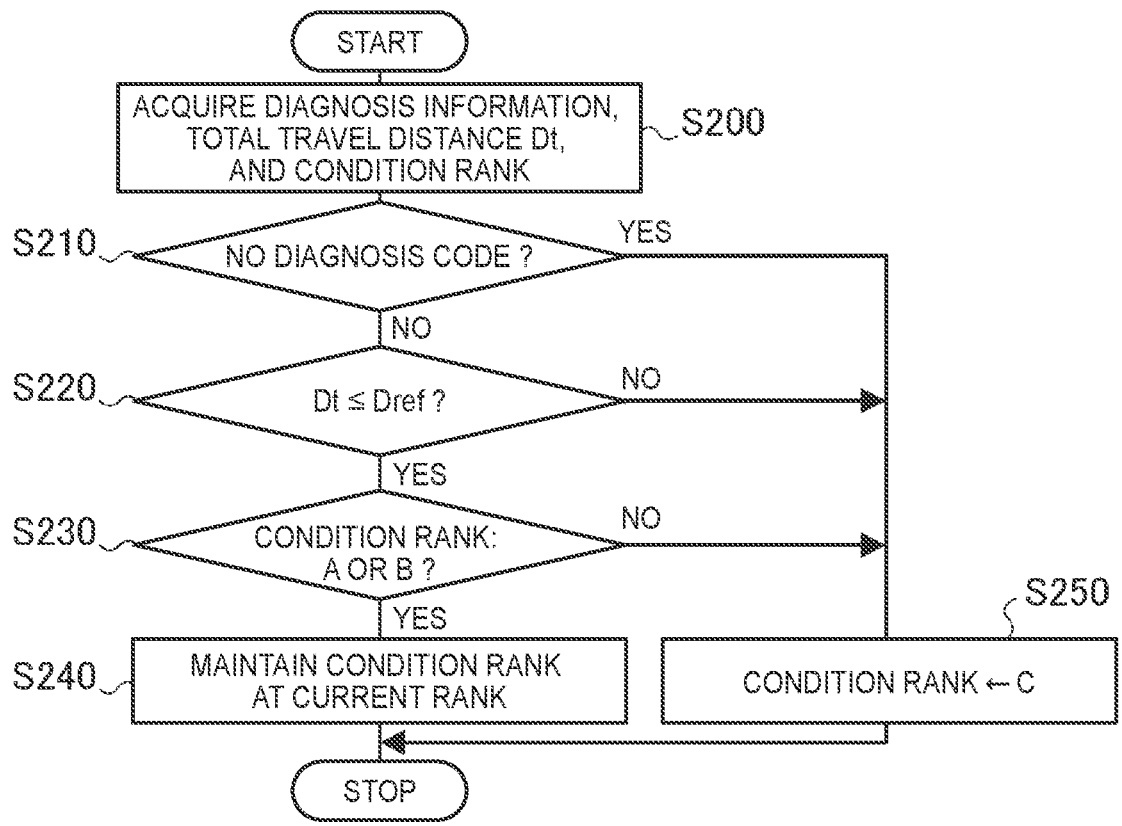
FIG. 4 is a table for illustrating a procedure to derive the condition rank of the in-vehicle device.
FIG. 5 is a flowchart showing an example of a rank determination routine to be executed by the evaluation unit of the condition evaluation system according to the embodiment of the disclosure.

An embodiment of the disclosure will be described with reference to the accompanying drawings.

FIG. 1 is a schematic configuration diagram 1 showing an example of a condition evaluation system for an in-vehicle device according to the embodiment of the disclosure. The condition evaluation system 1 shown in FIG. 1 is used to evaluate the condition of a transaxle 20 that is an in-vehicle device of an electrically-powered vehicle 10, such as a hybrid vehicle and an electric vehicle (including a fuel cell electric vehicle). The condition evaluation system 1 includes a server 2 and a computer 5. The server 2 serves as an information processing center that processes various pieces of information from the electrically-powered vehicle 10.

The electrically-powered vehicle 10 shown in FIG. 1 is a hybrid vehicle including an engine (internal combustion engine) (not shown), the transaxle (powertrain) 20, and a battery (electrical storage device) (not shown). The transaxle 20 includes motor generators MG1, MG2 that are synchronous generator-motors (three-phase alternating-current motors). The battery exchanges electric power with each of the motor generators MG1, MG2 of the transaxle 20 via an inverter and the like (not shown). The electrically-powered vehicle 10 includes a controller 30 and a communication module 35. The controller 30 executes various controls including travel control. The communication module 35 is used to exchange information with the server 2.

As shown in FIG. 1, the transaxle 20 includes a planetary gear 21, a gear train 22, a differential gear 23 coupled to right and left drive shafts, a plurality of bearings 24, and a case 25 accommodating these components, in addition to the motor generators MG1, MG2. The planetary gear 21 includes a sun gear, a planetary carrier, and a ring gear. The sun gear is coupled to the rotor of the motor generator MG1. The planetary carrier supports a plurality of pinion gears such that the pinion gears are rotatable. The planetary carrier is coupled to the crankshaft of the engine via a damper mechanism. The ring gear integrally rotates with a counter drive gear that is a component of the gear train 22.

The motor generator MG1 mainly operates as a generator that converts at least part of power from the engine operated under load to electric power. A drive gear in mesh with a counter driven gear that is a component of the gear train 22 is fixed to the rotor of the motor generator MG2. The motor generator MG2 is coupled to the right and left drive shafts via the gears and the differential gear 23. The motor generator MG2 mainly operates as an electric motor that is driven by at least any one of electric power from the battery and electric power from the motor generator MG1 and to generate driving torque to the drive shafts. In addition, the motor generator MG2 outputs regenerative braking torque at the time of braking the electrically-powered vehicle 10.

When the electrically-powered vehicle 10 travels, the controller 30 sets a required torque to be output to the drive shafts, corresponding to an accelerator operation amount and a vehicle speed, and sets a required power (including zero) of the engine and torque commands $Tm1^*$, $Tm2^*$ to the motor generators MG1, MG2 based on the required torque and the like. The controller 30 acquires the rotation speeds Nm1, Nm2 of the motor generators MG1, MG2 via associated resolvers or the like (not shown). The communication module 35 is capable of communicating with the server 2 via a network, such as the Internet.

In the present embodiment, while the system of the electrically-powered vehicle 10 is in operation, the controller 30 sends, to the server 2, necessary information to evaluate the condition of the transaxle 20 that is the in-vehicle device. In other words, while the system of the electrically-powered vehicle 10 is in operation, the controller 30 acquires every predetermined period of time (for example, 100 to 500 msec) the torque command Tm2* to the motor generator MG2 and the rotation speed Nm2 of the motor generator MG2, which are physical quantities indicating a load on the transaxle 20 when the electrically-powered vehicle 10 is used, and sends the torque command Tm2* and the rotation speed Nm2 to the server 2 via the communication module 35 as load information.

When an abnormality diagnosis of the transaxle 20 is performed by the controller 30 or another controller, the controller 30 acquires the result of the abnormality diagnosis. When it is diagnosed through abnormality diagnosis that the transaxle 20 has an abnormality, the controller 30 sends a diagnosis code indicating the abnormality to the server 2 via the communication module 35. A diagnosed abnormality is finalized when, for example, the same abnormality is detected a predetermined number of times during one trip of the electrically-powered vehicle 10. When travel (one trip) of the electrically-powered vehicle 10 ends, the controller 30 acquires a total travel distance Dt of the electrically-powered vehicle 10 at that point in time, and sends the total travel distance Dt to the server 2 via the communication module 35.

The server 2 that is a component of the condition evaluation system 1 is installed and managed by, for example, a business operator X that mediates the recycle of the transaxle 20 in the present embodiment. The server 2 includes a computer and a communication module. The computer includes a CPU, a ROM, a RAM, an input/output device, and the like. The communication module is capable of communicating with a large number of electrically-powered vehicles (hybrid vehicles and electric vehicles) including the electrically-powered vehicle 10 via a network, such as the Internet. An evaluation module (evaluation unit) 3 is constructed in the server 2 by cooperation between hardware such as the CPU, the ROM, and the RAM and various preinstalled programs. The evaluation module 3 serves as an evaluation unit that evaluates the conditions of transaxles of a large number of electrically-powered vehicles, including the transaxle 20 of the electrically-powered vehicle 10. The server 2 further includes a storage device 4 that stores a database. The database stores a condition rank, diagnosis information, and a total travel distance Dt for each of the large number of electrically-powered vehicles. The condition rank is an evaluation result on the condition of the transaxle 20 or the like by an evaluation module 3. The diagnosis information indicates whether a diagnosis code is sent from the electrically-powered vehicle 10 or the like. The database stores a condition rank, diagnosis information, and a total travel distance Dt in association with the model or ID of an electrically-powered vehicle, the model or ID of a transaxle, or the like.

The computer 5 that is a component of the condition evaluation system 1 includes a CPU, a ROM, a RAM, an input/output device, a storage device, and the like. The computer 5 is managed by a business operator Y that is different from the business operator X and that mediates the remanufacturing of the transaxle 20 or the reuse of component parts of the transaxle 20 in the present embodiment. The computer 5 is capable of communicating with the server 2 via a communication module (not shown), and the Internet, a dedicated line, or the like. An evaluation module (second evaluation unit) 6 is constructed in the computer 5 by cooperation between hardware such as the CPU, the ROM, and the RAM and various preinstalled programs. The evaluation module 6 serves as an evaluation unit that finalizes evaluation of the condition of the transaxle 20 or the like of the electrically-powered vehicle 10 based on the condition rank or the like obtained from the evaluation module 3 of the server 2. A storage device 7 is further connected to the computer 5 and stores a database. The database stores a final condition rank for each of a large number of electrically-powered vehicles. The final condition rank is the evaluation result of the condition of a transaxle by the evaluation module 6. The database stores a final condition rank in association with the model or ID of an electrically-powered vehicle, the model or ID of a transaxle, or the like.

Subsequently, a procedure to evaluate the condition of the transaxle 20 and the like by the evaluation module 3 of the server 2 and the evaluation module 6 of the computer 5 will be described with reference to FIG. 2 to FIG. 6.

FIG. 2 is a flowchart showing an example of a rank derivation routine to be executed by the evaluation module 3 of the server 2. The rank derivation routine of FIG. 2 is executed by the evaluation module 3 of the server 2 each time the server 2 receives load information indicating a load on the transaxle 20 or the like from any one of a large number of electrically-powered vehicles (here, the electrically-powered vehicle 10). At the start of the routine of FIG. 2, the evaluation module 3 of the server 2 acquires the torque command Tm2* to the motor generator MG2 and the rotation speed Nm2 of the motor generator MG2 as the load information sent from the electrically-powered vehicle 10 (step S100).

Subsequently, the evaluation module 3 sequentially derives a condition rank for each of component parts of the transaxle 20 based on the torque command Tm2* and the rotation speed Nm2 (step S110 to step S150). In the present embodiment, the evaluation module 3 sequentially sets condition ranks for the motor generator MG1, motor generator MG2, case 25, predetermined gear, and predetermined bearing 24 of the transaxle 20. In the present embodiment, a gear that is a condition rank set object is a gear (weakest gear) on which the highest load acts among the plurality of gears included in the planetary gear 21, the gear train 22, and the differential gear 23. The bearing 24 that is a condition rank set object is the bearing 24 (weakest bearing) on which the highest load acts among the plurality of bearings 24.

In step S110, the evaluation module 3 calculates the product of the torque command Tm2* and the rotation speed Nm2 and derives a load on an intended component part based on the calculated product. In the present embodiment, a map that defines the relationship between the product of a torque command Tm2* and a rotation speed Nm2 and a load that acts on the component part is prepared for each of the component parts including the motor generator MG1, the motor generator MG2, the case 25, the predetermined gear, and the predetermined bearing 24. In step S110, a load associated with the product is derived from the map associated with the intended component part.

After the process of step S110, the evaluation module 3 determines whether the load on the intended component part is greater than or equal to a fatigue limit fl acquired in advance for the component part (step S120). When the evaluation module 3 determines that the load on the intended component part is greater than or equal to the fatigue limit fl (YES in step S120), the evaluation module 3 increments a cumulative load frequency by one (step S130). A cumulative load frequency indicates the number of times (frequency) a load acts on the component part becomes greater than or equal to the fatigue limit fl. When the evaluation module 3 determines that the load is less than the fatigue limit fl (NO in step S120), the evaluation module 3 maintains the cumulative load frequency at a current value without incrementing the cumulative load frequency. In addition, the evaluation module 3 calculates a difference between the cumulative load frequency and a predetermined reference repetition count as an estimated allowance of the intended component part in consideration of, for example, the fatigue limit of the intended component part (step S140). The fatigue limit fl, reference repetition count, and the like of each component part are determined in advance from a map that defines the relationship between a load on each component part and a repetition count of load, as shown in FIG. 3. After calculating an estimated allowance for the intended component part, the evaluation module 3 determines whether an estimated allowance has been calculated for each of the motor generators MG1, MG2, case 25, gear, and bearing 24 (step S150), and repeatedly executes the processes of step S110 to step S150 until an estimated allowance has been calculated for each of the component parts.

After calculating an estimated allowance for each of the motor generators MG1, MG2, case 25, gear, and bearing 24, the evaluation module 3 derives the condition rank of the transaxle 20 from the estimated allowances of all the component parts (step S160). In step S150, the evaluation module 3 compares the estimated allowance with a threshold determined in advance for each component part for each of the motor generators MG1, MG2, the case 25, the gear, and the bearing 24. In the present embodiment, when the estimated allowance is greater than or equal to the threshold, the evaluation module 3 determines that the component part is reusable; whereas, when the estimated allowance is less than the threshold, the evaluation module 3 determines that the component part is unreusable.

When the evaluation module 3 determines that each of the motor generators MG1, MG2, the case 25, the gear, and the bearing 24 is reusable, the evaluation module 3 sets the condition rank to rank A (first rank) indicating that remanufacturing of the entire transaxle 20 is available, as shown in FIG. 4. When the evaluation module 3 determines that both the motor generators MG1, MG2 are reusable and at least any one of the case 25, the gear, and the bearing 24 is unreusable, the evaluation module 3 sets the condition rank to rank B1 (second rank) indicating that both the motor generators MG1, MG2 are reusable and the component parts other than both the motor generators MG1, MG2 of the transaxle 20 should be recycled, as shown in FIG. 4. When the evaluation module 3 determines that any one of the motor generators MG1, MG2 is reusable and at least any one of the case 25, the gear, and the bearing 24 is unreusable, the evaluation module 3 sets the condition rank to rank B2 or rank B3 (second rank) indicating that any one of the motor generators MG1, MG2 is reusable and the component parts other than both the motor generators MG1, MG2 of the transaxle 20 should be recycled, as shown in FIG. 4. When the evaluation module 3 determines that both the motor generators MG1, MG2 are unreusable, the evaluation module 3 sets the condition rank to rank C (third rank) indicating that all the component parts of the transaxle 20 should be recycled regardless of the conditions of the case 25, the gear, and bearing 24, as shown in FIG. 4.

The evaluation module 3 derives the condition rank of the transaxle 20 in step S160, then stores the derived condition rank in the storage device 4 in association with the IDs or the like of the electrically-powered vehicle 10 and transaxle 20 (step S170), and ends the rank derivation routine of FIG. 2. In other words, the evaluation module 3 derives a cumulative load frequency for each of the plurality of component parts of the transaxle 20 based on load information from the electrically-powered vehicle 10 and derives a condition rank based on the cumulative load frequency of each of the plurality of component parts (step S100 to step S160). The cumulative load frequency is a frequency that a load becomes greater than or equal to the associated fatigue limit fl. Thus, it is possible to properly derive the condition rank of the transaxle 20 according to a used condition of the electrically-powered vehicle 10. When the rank derivation routine is repeatedly executed, the condition rank of each of the transaxle 20 and the like is updated with a lapse of time for each of a large number of electrically-powered vehicles including the electrically-powered vehicle 10 and the like in the server 2 (storage device 4). Therefore, when a purchase assessor is enabled to access the server 2 of a business operator X from a terminal or the like, for example, in purchase or trade-in of the electrically-powered vehicle 10 or the like, as shown in FIG. 1, it is possible to further properly determine the purchase price of the electrically-powered vehicle 10 or the like.

Subsequently, a procedure to derive the condition rank of the transaxle 20 at the time when disposal of the electrically-powered vehicle 10 is finalized will be described with reference to FIG. 5. FIG. 5 is a flowchart showing an example of a rank determination routine to be executed by the evaluation module 3 of the server 2 when, for example, filing of an application for disposal (permanent deletion registration) of the electrically-powered vehicle 10 is informed to the server 2 or the transaxle 20 removed from the disused electrically-powered vehicle 10 is carried into the business operator X.

At the start of the routine of FIG. 5, the evaluation module 3 of the server 2 acquires (reads out) the condition rank, diagnosis information, and total travel distance Dt, associated with the applicable electrically-powered vehicle 10 (transaxle 20) from the storage device 4 (step S200). The evaluation module 3 determines whether there is a diagnosis code in the acquired diagnosis information (step S210). When the evaluation module 3 determines that there is no diagnosis code and it is diagnosed that no abnormality in the transaxle 20 is occurring at the electrically-powered vehicle 10 side before finalization of vehicle disposal (NO in step S210), the evaluation module 3 determines whether the total travel distance Dt of the electrically-powered vehicle 10, acquired in step S200, is shorter than or equal to a predetermined value Dref (for example, about 100000 km) (step S220).

When the evaluation module 3 determines that the total travel distance Dt is shorter than or equal to the predetermined value Dref (YES in step S220), the evaluation module 3 determines whether the condition rank is any one of rank A, rank B1, rank B2, and rank B3 (step S230). When the evaluation module 3 determines that the condition rank is rank A, rank B1, rank B2, or rank B3 (YES in step S230), the evaluation module 3 maintains the condition rank at the current rank (any one of rank A, rank B1, rank B2, and rank B3) (step S240) and ends the routine of FIG. 5.

On the other hand, when the evaluation module 3 determines that there is a diagnosis code and it is diagnosed that there is an abnormality in the transaxle 20 at the electrically-powered vehicle 10 side before finalization of vehicle disposal (YES in step S210), the evaluation module 3 sets the condition rank of the transaxle 20 to rank C regardless of the current rank (step S250) and ends the routine of FIG. 5. When the evaluation module 3 determines that the total travel distance Dt of the electrically-powered vehicle 10 exceeds the predetermined value Dref (NO in step S220), the evaluation module 3 sets the condition rank of the transaxle 20 to rank C regardless of the current rank (step S250) and ends the routine of FIG. 5. When the evaluation module 3 determines that the condition rank is rank C in step S230 (NO in step S230), the evaluation module 3 maintains the condition rank at rank C that is the current rank (step S250) and ends the routine of FIG. 5.

When the above-described rank determination routine is executed in response to finalization of disposal of the electrically-powered vehicle 10, it is possible to bring the condition rank of the transaxle 20 further into conformity with an actual situation such that the condition rank reflects the result of abnormality diagnosis, performed by the electrically-powered vehicle 10, and an actual operating time according to a travel distance. Thus, the business operator X is able to easily, quickly determine (sort) whether the transaxle 20 carried in or to be carried in from a wrecking company or the like should be recycled (rank C) or at least some of component parts are reusable (rank A, rank B1, rank B2, or rank B3) by looking up the condition rank obtained through the rank determination routine. Therefore, the business operator X is able to, after performing visual inspection on the carried-in transaxle 20, quickly carry out the transaxle 20 that should be recycled to a recycling company P that is a purchaser or carry out the reusable or remanufacturable transaxle 20 to a business operator Y. As a result, with the condition evaluation system 1, it is possible to properly and rationally proceed with recycle and reuse of powertrains installed in hybrid vehicles and electric vehicles, such as the transaxle 20.

When the reusable or remanufacturable transaxle 20 is carried into the business operator Y, the condition rank of the transaxle 20 is acquired from the server 2 of the business operator X to the computer 5. In addition, the transaxle 20 is subjected to electric characteristics inspection and ATF inspection by the business operator Y. The electric characteristics inspection is to inspect the electrical insulation performance and the like of stator coils of the motor generators MG1, MG2. In the present embodiment, in accordance with the condition rank acquired from the server 2, both the motor generators MG1, MG2 are subjected to electric characteristics inspection for the transaxle 20 of rank A or rank B1, and any one of the motor generators MG1, MG2 is subjected to electric characteristics inspection for the transaxle 20 of rank B2 or rank B3. The ATF inspection is to check for damage or the like to the gears and bearings 24 by investigating residual foreign matter in ATF (automatic fluid oil) used to lubricate and cool the transaxle 20. In the present embodiment, in accordance with the condition rank acquired from the server 2, only the transaxle 20 of rank A is subjected to ATF inspection and electric characteristics inspection. After completion of electric characteristics inspection and ATF inspection, the results of the inspections are input to the computer 5 by a worker, and the evaluation module 6 of the computer 5 executes a rank finalization routine shown in FIG. 6 in response to instructions from the worker.

At the start of the routine of FIG. 6, the evaluation module 6 of the computer 5 acquires the condition rank of the applicable transaxle 20, acquired from the server 2, and the results of ATF inspection and electric characteristics inspection (step S300). Subsequently, the evaluation module 6 determines whether the condition rank from the server 2 is rank A or rank B1 (step S310). When the condition rank is rank A or rank B1 (YES in step S310), the evaluation module 6 determines whether the result of electric characteristics inspection of each of the motor generators MG1, MG2 is good (step S320).

When the result of electric characteristics inspection of each of the motor generators MG1, MG2 is good (YES in step S320), the evaluation module 6 determines whether the result of ATF inspection on the transaxle 20 is good (step S330). When the result of ATF inspection on the transaxle 20 is good (YES in step S330), the evaluation module 6 sets (maintains) a final condition rank to rank A and stores the final condition rank in the storage device 7 in association with the ID or the like of the transaxle 20 (step S340), and then ends the routine of FIG. 6. In contrast, when the result of ATF inspection on the transaxle 20 is not good (NO in step S330), the evaluation module 6 sets the final condition rank to rank B1 and stores the final condition rank in the storage device 7 in association with the ID or the like of the transaxle 20 (step S350), and then ends the routine of FIG. 6.

In the present embodiment, only the transaxle 20 of rank A is subjected to ATF inspection as described above, and information that ATF inspection is not performed is input to the computer 5 for the transaxle 20 of rank B1, rank B2, or rank B3 on which ATF inspection is not performed. In step S330, even when the condition rank from the server 2 is rank B1 and the result of electric characteristics inspection of each of the motor generators MG1, MG2 is good but ATF inspection is not performed, determination is negative, and the final condition rank is maintained at the condition rank (=B1) from the server 2 in step S350.

When the condition rank from the server 2 is rank B2 or rank B3 (NO in step S310), the evaluation module 6 determines whether the result of electric characteristics inspection of one of the motor generators MG1, MG2 according to the condition rank from the server 2 is good (step S360). When the result of electric characteristics inspection of one of the motor generators MG1, MG2 according to the condition rank from the server 2 is good (YES in step S360), the evaluation module 6 sets (maintains) the final condition rank to rank B2 or rank B3 from the server 2 and stores the final condition rank in the storage device 7 in association with the ID or the like of the transaxle 20 (step S370), and then ends the routine of FIG. 6.

When the result of electric characteristics inspection of each of the motor generators MG1, MG2 is not good (NO in step S320), the evaluation module 6 determines whether the result of electric characteristics inspection of any one of the motor generators MG1, MG2 is good (step S360). When the result of electric characteristics inspection of one of the motor generators MG1, MG2 is good (YES in step S360), the evaluation module 6 sets the final condition rank to rank B2 or rank B3 in accordance with the result of electric characteristics inspection and stores the final condition rank in the storage device 7 in association with the ID or the like of the transaxle 20 (step S370), and then ends the routine of FIG. 6.

On the other hand, when determination is negative in step S360, it means that the condition rank from the server 2 is any one of rank A, rank B1, rank B2, and rank B3 but the result of electric characteristics inspection of each or one of the motor generators MG1, MG2 is not good. For this reason, when determination is negative in step S360, the evaluation module 6 sets the final condition rank to rank C and stores the final condition rank in the storage device 7 in association with the ID or the like of the transaxle 20 (step S380), and then ends the routine of FIG. 6.

When the computer 5 of the business operator Y is caused to execute the rank finalization routine as described above, it is possible to obtain a final condition rank exceedingly properly reflecting the condition of the transaxle 20. Thus, the business operator Y that uses the condition evaluation system 1 is able to properly and rationally proceed with recycle, reuse, and remanufacturing of powertrains installed in hybrid vehicles and electric vehicles, such as the transaxle 20, while looking up the final condition ranks. In other words, the business operator Y performs washing, replacement of consumables, various inspections, and the like on a transaxle 20 of which the final condition rank is rank A, and then sells the transaxle 20 to a parts sales company Q, a dealer R, or the like as supply parts. The business operator Y disassembles a transaxle 20 of which the final condition rank is rank B1, rank B2, or rank B3, performs various inspections and the like on each or one of the motor generators MG1, MG2, and then sells the motor generator MG1 and/or the motor generator MG2 to a parts sales company Q or the like. In this case, the business operator Y sells the component parts of the transaxle 20, other than the motor generator MG1 and/or the motor generator MG2, to a recycling company P. The business operator Y sells a transaxle 20 of which the final condition rank is rank C to the recycling company P.

As described above, the condition evaluation system 1 for an in-vehicle device according to the embodiment of the disclosure includes the evaluation module 3 that is constructed in the server 2 and that acquires a torque command Tm2* and a rotation speed Nm2 that are load information indicating a load on the transaxle 20 when the transaxle 20 is used by the electrically-powered vehicle 10. Each time the evaluation module 3 acquires load information from the electrically-powered vehicle 10, the evaluation module 3 derives, based on the load information, a condition rank indicating at least whether the transaxle 20 should be recycled (step S100 to step S160 in FIG. 2). In other words, the condition rank derived by the evaluation module 3 includes rank A indicating that the entire transaxle 20 is reusable, rank B1, rank B2, and rank B3 indicating that at least any one of the motor generators MG1, MG2 that are component parts of the transaxle 20 is reusable, and rank C indicating that the transaxle 20 should be recycled. The condition rank of the transaxle 20, derived by the evaluation module 3, is stored in the storage device 4 of the server 2 (step S170 in FIG. 2).

Thus, by looking up the condition rank stored in the storage device 4 of the server 2, it is possible to determine whether the transaxle 20 should be recycled or at least part (motor generator) of the transaxle 20 is reusable. As a result, by using the condition evaluation system 1, it is possible to properly and rationally proceed with recycle, reuse, and remanufacturing of powertrains installed in hybrid vehicles and electric vehicles, such as the transaxle 20. In addition, by looking up the condition rank including rank A, rank B1, rank B2, rank B3, and rank C, it is possible to properly determine the transaction price of the transaxle 20 or component part to be remanufactured or reused and also the purchase price of the electrically-powered vehicle 10 and to make it easy to determine a destination to which a used product is transported to reduce complexity of logistics.

The evaluation module 3 of the server 2 derives a cumulative load frequency, which is a frequency that a load becomes greater than or equal to an associated fatigue limit fl, for each of a plurality of component parts of the transaxle 20, that is, the motor generators MG1, MG2, the case 25, the gear, and the bearing 24, based on a torque command Tm2* and a rotation speed Nm2 (load information) from the electrically-powered vehicle 10, and derives a condition rank based on the cumulative load frequencies of the plurality of component parts (step S110 to step S160 in FIG. 2). Thus, it is possible to properly derive the condition rank of the transaxle 20 according to a used condition of the electrically-powered vehicle 10. The load information of the transaxle 20 is not limited to the torque command Tm2* and rotation speed Nm2 of the motor generator MG2. The condition rank may be derived based on an index other than the above-described cumulative load frequency (estimated allowance).

The evaluation module 3 of the server 2 acquires diagnosis information indicating a diagnosed result of the transaxle 20 by the electrically-powered vehicle 10 and a total travel distance Dt of the electrically-powered vehicle 10 in response to finalization of disposal of the electrically-powered vehicle 10 (step S200 in FIG. 5), and, when it is diagnosed at the electrically-powered vehicle 10 side that there is an abnormality in the transaxle 20 or the total travel distance Dt exceeds the predetermined value Dref, sets the condition rank to rank C (step S210, step S220, and step S250 in FIG. 2). Thus, it is possible to bring the condition rank further in conformity with an actual situation.

The condition evaluation system 1 includes the computer 5 in which the evaluation module 6 is constructed. The evaluation module 6 derives a condition rank derived by the evaluation module 3 of the server 2, and a final condition rank of the transaxle 20 based on the results of electric characteristics inspection and ATF inspection on the transaxle 20 removed from the electrically-powered vehicle 10. Thus, it is possible to properly and rationally proceed with recycle, reuse, and remanufacturing of the transaxle 20 and the like by looking up the final condition rank exceedingly properly reflecting the condition of the transaxle 20.

In the embodiment, the evaluation module 3 and the storage device 4 that execute the rank derivation routine of FIG. 2 are included in the server 2 capable of communicating with the electrically-powered vehicle 10, and the computer 5 in which the evaluation module 6 that executes the rank finalization routine of FIG. 5 is constructed is managed by the business operator (manager) Y different from the business operator (manager) X that manages the server 2; however, the configuration is not limited thereto. In other words, the routines of FIG. 2 and FIG. 5 may be executed by a single server (computer) or the like, and the condition rank and final condition rank of the transaxle 20 may be provided by, for example, a single business operator that collectively mediates recycle, reuse, and remanufacturing of the transaxle 20. In this case, the rank finalization routine of FIG. 5 may be executed before finalization of disposal of the electrically-powered vehicle 10, just after execution of the rank derivation routine of FIG. 2, or at predetermined intervals.

As in the case of the above-described embodiment, when the condition rank of the transaxle 20 is derived and stored at the server 2 side including the evaluation module 3 and the storage device 4, it is possible to obtain a useful condition rank while reducing a computation load in the electrically-powered vehicle 10; however, the configuration is not limited thereto. A controller or the like that corresponds to the evaluation module 3 and the storage device 4 may be installed in the electrically-powered vehicle 10. In this case, the controller may have the function of the evaluation module 6, and the condition rank and the final condition rank may be acquired from the controller or the like via wire or wirelessly.

An in-vehicle device to which the condition evaluation system 1 is applied is not limited to the transaxle 20 including the motor generators MG1, MG2. In other words, the condition evaluation system 1 may be applied to a transaxle (powertrain) including a single motor generator (electric motor), a gear mechanism, and the like and may also be applied to an in-vehicle device, such as a step transmission or a continuously variable transmission that does not include an engine or an electric motor.

The disclosure of the disclosure is not limited to the above-described embodiment and, of course, encompasses various modifications within the scope of the disclosure. The embodiment is only a specific one mode of the disclosure described in SUMMARY and does not intend to limit the elements of the disclosure described in SUMMARY.

The disclosure of the disclosure is usable in recycling companies, reuse companies, and remanufacturing companies of in-vehicle devices.

What is claimed is:

1. A condition evaluation processor for evaluating a condition of an in-vehicle device installed in a vehicle, wherein the condition evaluation processor is programmed to:
   acquire, from the vehicle, a torque command to a motor generator and a rotation speed of the motor generator,
   derive a load on the in-vehicle device based on a product of the torque command and the rotation speed,
   increment a cumulative load frequency in response to the load on the in-vehicle device being greater than or equal to a fatigue limit, wherein the fatigue limit is acquired in advance for the in-vehicle device,
   derive a condition rank of the in-vehicle device, the in-vehicle device being determined reusable in response to the cumulative load frequency being less than predetermined reference repetition count, and the in-vehicle device being determined unreusable in response to the cumulative load frequency being greater than or equal to the predetermined reference repetition count,
   store the condition rank in a memory, and
   proceed with recycle or reuse of the in-vehicle device based on the condition rank.

2. The condition evaluation processor according to claim 1, wherein the condition rank includes a first rank indicating that the entire in-vehicle device is reusable, a second rank indicating that some of component parts of the in-vehicle device are reusable, and a third rank indicating that the in-vehicle device should be recycled.

3. The condition evaluation processor according to claim 2, wherein:
   the in-vehicle device includes a plurality of component parts;
   the condition evaluation processor is further programmed to derive the cumulative load frequency for each of the plurality of component parts; and
   the condition evaluation processor is further programmed to derive the condition rank based on the cumulative load frequencies respectively derived for the plurality of component parts.

4. The condition evaluation processor according to claim 2, further being programmed to:
   acquire diagnosis information and a travel distance of the vehicle, the diagnosis information indicating a diagnosed result of the in-vehicle device by the vehicle; and
   set the condition rank to the third rank in response to the vehicle diagnosing that there is an abnormality in the in-vehicle device or the travel distance of the vehicle exceeds a predetermined value.

5. The condition evaluation processor according to claim 1, further being programmed to derive a final condition rank of the in-vehicle device based on the stored condition rank and a result of inspection on the in-vehicle device removed from the vehicle.

6. The condition evaluation processor according to claim 1, wherein the condition evaluation processor is included in a server capable of communicating with the vehicle.

7. The condition evaluation processor according to claim 1, wherein the condition evaluation processor is installed in the vehicle.

8. The condition evaluation processor according to claim 1, wherein the in-vehicle device is a powertrain including an electric motor.

* * * * *